United States Patent [19]

Smith

[11] Patent Number: 4,771,989

[45] Date of Patent: Sep. 20, 1988

[54] APPARATUS FOR MOUNTING TUBULAR COMPOSITE SPRINGS

[75] Inventor: Frank F. Smith, Seattle, Wash.

[73] Assignee: The Paton Corporation, Seattle, Wash.

[21] Appl. No.: 936,432

[22] Filed: Dec. 1, 1986

[51] Int. Cl.$^4$ .................. B60G 11/52; F16M 13/00; F16D 1/00; F16B 19/00

[52] U.S. Cl. ......................... 267/33; 248/565; 248/621; 248/622; 267/249; 267/292; 403/220; 403/226; 411/508; 411/531

[58] Field of Search ............ 267/33, 63 R, 60, 61 R, 267/61 S, 20 A, 136, 140, 180, 140.4, 152, 153, 166, 167, 170, 169, 179, 64.11, 64.23, 64.27, 292, 257, 258, 166.1, 249, 286, 288; 280/662, 666, 668, 670, 671, 673; 248/560, 565, 634, 638, 615, 621, 623, 622; 24/290; 411/545, 531, 508-510; 403/226, 227, 220; 188/321.11

[56] References Cited

U.S. PATENT DOCUMENTS

| | | |
|---|---|---|
| 1,069,452 | 8/1913 | Martin ........................ 267/179 X |
| 1,936,389 | 11/1933 | Halquist . |
| 2,005,089 | 6/1935 | Krebs . |
| 2,230,069 | 1/1941 | Rushmore . |
| 2,605,099 | 7/1952 | Brown . |
| 2,661,206 | 12/1953 | Gregoire ........................ 267/60 |
| 2,822,165 | 2/1958 | Boschi . |
| 3,037,764 | 6/1962 | Paulsen . |
| 3,118,659 | 1/1964 | Paulsen . |
| 3,159,391 | 12/1964 | Wilfert et al. ................. 267/20 A |
| 3,279,779 | 10/1966 | Thomas et al. . |
| 3,447,814 | 6/1969 | Siber et al. . |
| 3,583,693 | 6/1971 | Johnston ........................ 267/63 R |

FOREIGN PATENT DOCUMENTS

| | | |
|---|---|---|
| 160851 | 4/1954 | Australia . |
| 0045497 | 2/1982 | European Pat. Off. ........... 267/33 |
| 662622 | 7/1938 | Fed. Rep. of Germany . |
| 2834528 | 2/1980 | Fed. Rep. of Germany ...... 280/668 |
| 1440023 | 8/1966 | France . |
| 52-24676 | 2/1977 | Japan . |
| 58-118344 | 7/1983 | Japan . |
| 0196057 | 3/1965 | Sweden ........................ 267/179 |
| 755186 | 8/1956 | United Kingdom . |
| 1437525 | 5/1976 | United Kingdom . |

OTHER PUBLICATIONS

Rowland, "Suspension Simplicity from Paton," Automotive News, Jul. 28, 1986, at 32.

The Paton Corp., "The Electronic Suspension Revolution and the Paton Dry-Namic TM (Non-Hydraulic) Suspensions," Jun. 1986.

Gieck et al., "The 'Marsh Mellow' Spring," SAE Technical Paper 820,161, Feb. 22, 1982.

Moulton et al., "Rubber Springs for Vehicle Suspension," published by the Institute of Mechanical Engineering, 1956.

Primary Examiner—Andres Kashnikow
Assistant Examiner—Robert J. Oberleitner
Attorney, Agent, or Firm—Finnegan, Henderson, Farabow, Garrett and Dunner

[57] ABSTRACT

Two support assemblies for respectively supporting the tapered end and the cylindrical end of an elongated tubular elastomeric spring between two opposed spring seats are disclosed. The support assembly for the tapered end is made up of an elongated retaining member which is positionable generally transverse to and entirely inside the tapered end. This retaining member includes two inclined portions which bear down upon the inside of the tapered end when pulled in an outward direction by a bolt threadably secured to a conventional spring seat. The support assembly for the cylindrical end is made up of a second retaining member which is positionable generally transverse to and entirely inside the cylindrical end. The second retaining member includes a plurality of expandable flange portions which engage the inside of the cylindrical portion as the retaining member is pulled in an outward direction by a bolt threadably secured to the second spring seat. The spring is reinforced to resist bulging in response to the outwardly directed forces applied by the support assemblies.

6 Claims, 2 Drawing Sheets

APPARATUS FOR MOUNTING TUBULAR COMPOSITE SPRINGS

BACKGROUND OF THE INVENTION

This invention relates to elastomeric springs and, more particularly to apparatus for mounting tubular, composite springs.

Tubular, composite springs are made up of a tubular elastomeric body and a coil spring embedded in the body to reinforce it against lateral buckling. In many practical applications, it is desirable to mount such springs in locations in which they are subjected to axial compression loads, which may or may not be applied axially. While it is important to secure the ends of the spring to the sprung and unsprung mass associated with the particular application, it is particularly important to be able to maintain positive securement and positioning of the spring ends where bending or twisting forces are applied to the spring on account of such off-axis loads. This is a common requirement in many vehicular applications, since the location and orientation of the spring often are determined by the geometry of the suspension, the location of the shock absorbers and other factors.

In many vehicular applications, a further requirement is that one or both ends of the composite spring be mountable by the same spring seat as that used to mount the ends of a coil spring. This seat typically includes a protruding central portion which projects axially into one end of the coil spring, forming a circular shoulder which engages the inner face of, and positions, the outermost coil. When used with a composite spring, however, this seat tends to be unsatisfactory because the end of the spring, being formed of elastomer, is deformable in the region of contact with the seat. Consequently, external containment or clamping devices must be used to obtain the positive securement and positioning described above. In many practical vehicular applications, however, the suspension geometry does not provide sufficient space adjacent to the spring for such devices.

SUMMARY OF THE INVENTION

This invention overcomes or substantially mitigates these concerns by providing apparatus for mounting a composite spring between two seats, one or both of which may be the same as that used to mount the ends of a coil spring, through the use of internal, not external, support assemblies. The preferred, but not the only, composite spring with which this invention may be used is made up of a tubular elastomeric body having two reinforced end portions, one of which is tapered and has a generally conical interior surface terminating in a first opening, and the other of which is cylindrical and has a generally cylindrical surface terminating in a second opening larger than the first. The tapered, small end is mountable by a conventional spring seat of the type just described.

The apparatus comprises two internal support assemblies, a first support assembly for supporting the tapered, small end of the spring, and a second support assembly for supporting the cylindrical, large end of the spring. The first, or small end, spring support assembly comprises a first retaining member which has two oppositely inclined flange portions. When the first retaining member is positioned inside of the small end of the spring, adjacent and generally parallel to the plane of the first opening, these flange portions are engagable, respectively, in face-to-face relation with spaced apart portions of the generally conical interior surface of the small end of the spring. The first retaining member further includes an intermediate portion which fronts upon the first opening when the inclined flange portions are so engaged, and means acting between the intermediate portion of the first retaining member and one of the two seats for pulling the first retaining member toward the seat. As the first retaining member is so pulled, it draws the small end down upon, and secures it to, the seat.

The second, or large end, support assembly comprises a second retaining member having two or more parallel flange portions. When the second retaining member is positioned inside of the large end of the spring, adjacent and generally parallel to the face of the second opening, these flange portions are engagable, respectively, in face-to-face relation with spaced apart portions of the generally cylindrical interior surface of the large end of the spring. The second retaining member further includes an intermediate portion which fronts upon the second opening when the parallel flange portions are so engaged, and means acting between the intermediate portion of the second retaining member and the other seat for pulling the second retaining member toward the seat. As the second retaining member is so pulled, these parallel flange portions spread apart, and thus progressively engage, the generally cylindrical interior surface, while simultaneously drawing the large end down upon, and securing it to, the seat. In those practical applications involving a spring having both a small end and a large end, the large end of the spring is secured first by the large end support assembly. Once this is accomplished, the small end is secured.

It will be recognized that the apparatus just described may be used with other types of springs, and specifically with springs having two large ends or two small ends, provided the ends have sufficient reinforcement to resist the internal bulging forces applied to them by the support assemblies. It will be recognized that such reinforcement may be obtained by a coil spring embedded in the elastomer body, or by other means.

These and other features, objects and advantages of the present invention will become apparent from the detailed description and claims to follow, taken in conjunction with the accompanying drawings in which like parts bear like reference numerals.

DETAILED DESCRIPTION OF THE DRAWINGS

Figure 1:
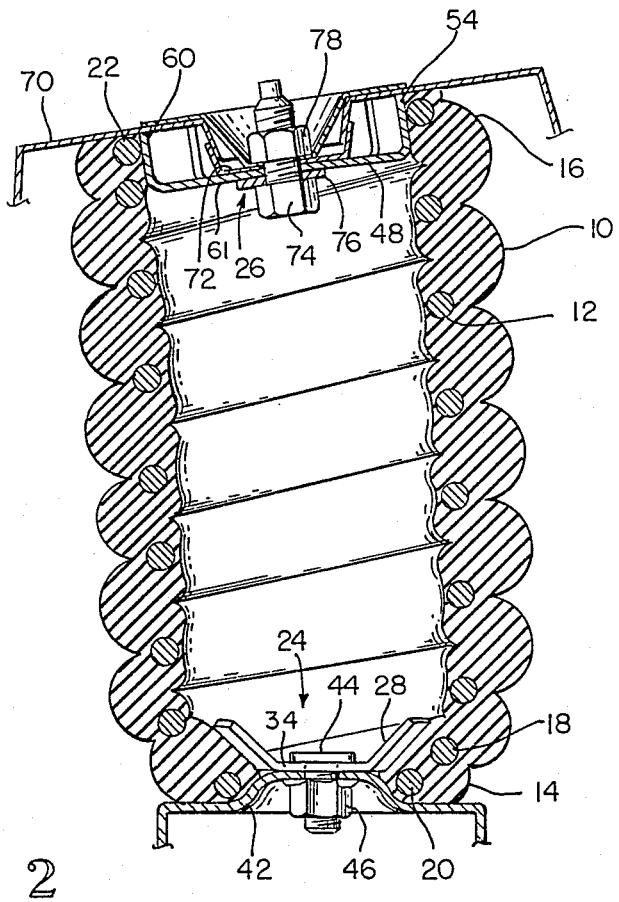
FIG. 1 is a longitudinal section of the apparatus for mounting tubular composite springs according to the present invention, depicting a large end support assembly and a small end support assembly supporting the ends of a tapered end composite spring at its design position.
Figure 5:
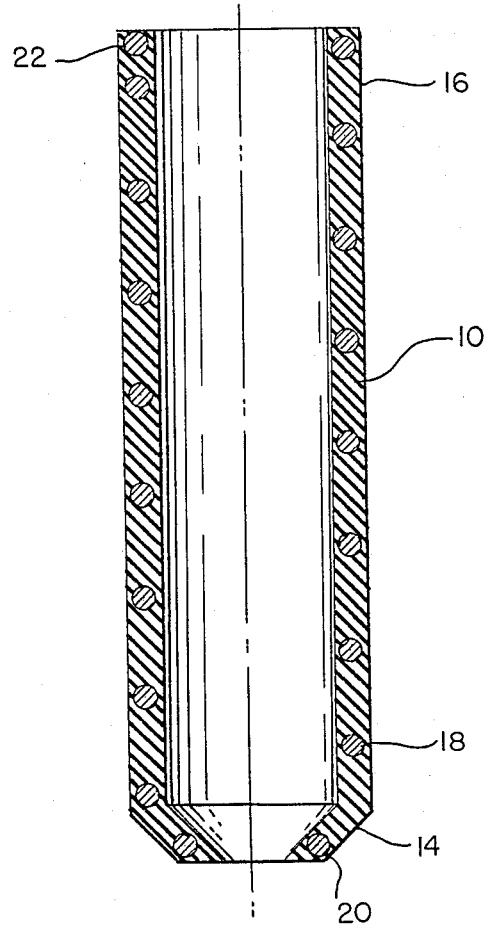
FIG. 5 is a longitudinal section of the FIG. 1 spring in its unloaded condition.

One presently preferred embodiment of the present invention, as illustrated in FIG. 1, is suitable for use with a composite spring made up of a tubular elastomeric body 10 and a coil spring 12 embedded in the body such that, at the design position illustrated, the body deforms to provide a continuous spiral convolution or "coil" shaped bulge, located between adjacent coils of spring 12. In its unloaded condition, however, body 10 has a generally cylindrical, straight sided profile, as illustrated in FIG. 5. In the example illustrated, one end of the spring is tapered or "necks down" to a first opening (generally referenced by numeral 14). The other, larger end of the spring terminates in an opening which corresponds in diameter to the interior diameter of the spring. (This large end is generally referenced by numeral 16.) End 14 is reinforced by coils 18 and 20. Likewise end 16 is reinforced by coil 22. Consequently, both ends 14 and 16 are reinforced by the underlying coils of spring 12 to resist outward bulging forces. The spring illustrated in the drawings has several advantages which arise out of the unique structure of end 14. Among these are: that end 14 permits it to be used with conventional coil spring mount, as will be described presently, and that it requires less elastomer, and hence is somewhat more economical, than a fully cylindrical composite spring of comparable load bearing capacity and performance.

Still referring to FIG. 1, one presently preferred embodiment of the present invention for mounting composite springs of the type shown is made up of two internal support assemblies, a small end support assembly (generally referenced by numeral 24) for supporting end 14, and a large end support assembly (generally referenced by numeral 26) for supporting end 16. The small end support assembly includes a retaining member 28 (FIG. 2) having two oppositely inclined flange portions 30 and 32 which are engagable, respectively, in face-to-face relation with two spaced apart portions of the generally conical interior surface of end 14, as shown (FIG. 1). Member 28 further includes an intermediate portion 34 which fronts upon the small end opening when portions 31 and 32 are so engaged.

Referring again to FIG. 1, the small end support assembly is operative with a seat 42 which is or may be conventionally suited for mounting a coil spring. In the example, seat 42 conforms to the profile of, and projects into, end 14. Seat 42 may be formed by appropriate supporting structure on the sprung or unsprung mass, as the case may be. A threaded stud 44 projects through hole 40, opposite to the directions of inclination of portions 30 and 32, a sufficient distance that it is insertable into and through a hole formed in seat 42. A flanged nut 46 is threaded into the outer end of stud 44 from beneath seat 42 so that, when tightened, stud 44 is drawn down upon and hence pulls portion 34 portion toward and into face-to-face contact with seat 42. Consequently, portions 30 and 32 apply pressure to the generally conical interior surface of end 14, so as to draw end 14 upon, and secure it to, seat 42.

To facilitate installation, stud 44 may be secured to portion 34 so that the distal end of stud 44 can be grasped in order to insert member 28 sideways through the opening in end 14. Once inserted, while still so grasping stud 44, member 28 is turned so that it is adjacent and generally parallel to the opening, with stud 44 projecting outwardly through it. The distal end of stud 44 thereupon can be released and then inserted through the hole in seat 42, whereupon it may be secured by nut 46, as described above.

Figure 2:
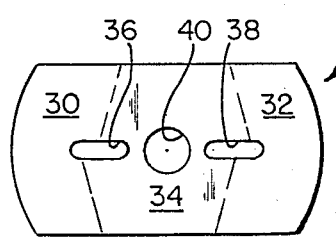
FIG. 2 is a top plan view of the retaining member of the FIG. 1 small end support assembly.

Referring in particular to FIG. 2, member 28 includes two elongated slots 36 and 38, which are separated by a central bolt hole 40. In the example, these slots are formed with their longitudinal edges perpendicular to the undersurface of portions 30, 32, and 34, and are in parallel alignment with the diameter of hole 40, taken along the longitudinal center line of member 28. As pressure is applied to the underlying generally conical interior surface of end 14, as just described, each of these slots causes the surface to bulge outwardly into them, thereby forming two spaced apart shoulders which abut against their longitudinal edges. So long as this pressure is maintained, these shoulders block member 28 from shifting rotatively about hole 40 with respect to the underlying surface of body 10.

Figure 3:
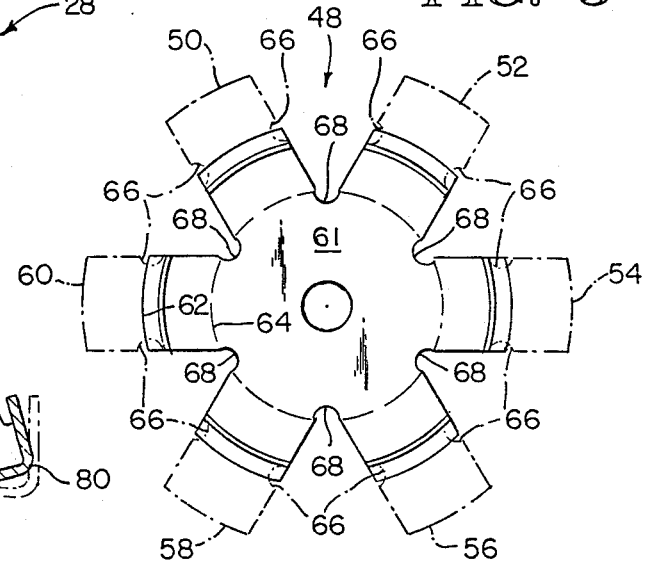
FIG. 3 is a top plan view of the retaining member of the FIG. 1 large end support assembly, depicting its flat pattern in broken lines.
Figure 4:
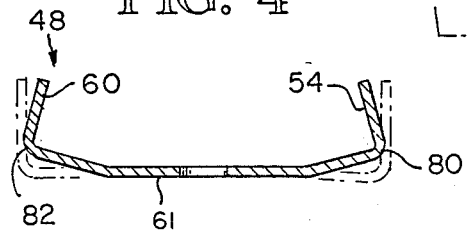
FIG. 4 is a side elevation of the FIG. 3 retaining member, depicting the position of its flanges after being bent during installation in broken lines.

Referring now to FIGS. 1, 3 and 4, the large end support assembly is made up of a retaining member 48 which, in the example, has six radial flange arms which terminate in upstanding flange portions 50, 52, 54, 56, 58, and 60. These are engagable, respectively, in face-to-face relation with spaced apart portions of the generally cylindrical interior surface of end 16. Member 48 further includes an intermediate portion 61 which fronts upon the opening in end 16 when portions 50, 52, 54, 56, 58, and 60 are so engaged.

Referring in particular to FIGS. 3 and 4, member 48 is pre-stressed, so that it is bendable about circular deformation lines 62 and 64. Line 62 intersects all of the flange arms at the bases of portions 50, 52, 54, 56, 58 and 60, as shown (FIG. 3). Line 64 likewise intersects these arms where they join portion 61. Opposed pairs of semicircular cut-outs 66 weaken portions 50, 52, 54, 56, 58 and 60 to facilitate bending of them along the intervening portion of line 62. Generally similar cut-outs 68 weaken the bases of the flange arms and likewise facilitate further bending. The purpose and effect of this bending action will be described presently.

Referring again to FIG. 1, the large end support assembly is operative with a seat 70 which, in the example, forms a flat surface 72, so disposed that it is located inside end 16 when the spring is positioned beneath seat 70, as shown (FIG. 1). Seat 70 may be formed by appropriate supporting structure on the sprung or unsprung mass, as the case may be. A bolt 74 extends through a washer 74 through a hole in surface 72. A flanged nut 78 is threaded onto the outer end of bolt 74 from beneath surface 72 so that, when tightened, bolt 74 is drawn down upon and hence pulls portion 61 toward and into face-to-face contact with surface 72.

Referring in particular to FIGS. 1 and 4, the flange arms preferably are of lengths sufficient that the bases of their flange portions (only portions 60 and 54 shown) firmly contact the generally cylindrical interior surface of end 16 when member 48 is first inserted into end 16, in the position illustrated in FIG. 1. (Such points of contact of portions 54 and 60 are referred to by numerals 80 and 82 in FIG. 4). The contact pressure obtained should be sufficient that the flange arms do not tend to shift axially along this surface when member 48 is pulled toward seat 70. Consequently, as portion 61 is pulled against surface 72, as described above, the flange portions bend simultaneously about these points of contact. To a lesser degree, the flange arms bend conjointly. The flange portions thus spread outwardly, as depicted by broken lines in FIG. 4, so as to expand into and positively engage body 10. The more pulling forces applied to portion 61, the more tightly the flange portions engage the generally cylindrical interior surface of end 16 until attaining the fully expanded position illustrated in FIG. 1. Consequently, as the flange portions so engage it, member 48 draws end 16 upon, and secures it to seat 70.

To install the spring illustrated in the drawings, end 16 is secured first by the large end support assembly just described. As will be appreciated, this assembly does not require that end 14 be secured in order to obtain the desired effect. Once this is accomplished, end 14 is secured as described above. Unlike the large end support assembly, the small end support assembly requires that end 16 already be and remain secured during the insertion and bolting down of member 28 as described above.

As will now be recognized, an important requirement of the present invention is that the composite spring possesses sufficient end reinforcement that the internal pressure applied to it by the retaining members does not produce undue deformation, causing their positive securement effects to be dissipated or lost altogether. In the example, this reinforcement is provided by the end coils 18, 20 and 22; however, satisfactory reinforcement may be obtained by other means such as tire cord or other hoop-like constraint surrounding the end portions of body 10, whether or not embedded in body 10.

While one presently preferred embodiment of the present invention has been illustrated and described herein, variations will become apparent to one of ordinary skill in the art. Accordingly, the invention is not to be limited to the specific embodiment illustrated and described herein, and the true scope and spirit of the invention are to be determined by reference to the appended claims.

The embodiments of the invention in which an exclusive property or privilege is claimed are defined as follows:

1. Apparatus for mounting a composite spring between two seats, said composite spring being made up of an elongated tubular elastomeric body having two end portions, one of which has a generally conical interior surface terminating in a first opening, and the other of which has a generally cylindrical interior surface terminating in a second opening larger than said first opening, each of said end portions being reinforced to resist deformation, said apparatus comprising: two assemblies for supporting said composite spring from the interior of said composite spring, a first support assembly for supporting said one end portion, and a second support assembly for supporting said other end portion; said first support assembly, comprising:
    a first elongated retaining member positionable generally transverse to and entirely inside said one end portion, said first retaining member having two oppositely inclined flange portions respectively engageable in face-to-face relation with two spaced apart portions of said generally conical interior surface, and an intermediate portion which fronts upon said first opening when said inclined flange portions are so engaged; and
    first pulling means acting between the intermediate portion of said first retaining member and one of said seats for pulling said first retaining member outwardly toward said one seat;
    wherein said first retaining member includes means forming an edge extending generally parallel to the length of said retaining member, said edge being so constructed and arranged that a portion of said generally conical interior surface forms into a shoulder next to said edge and thereby blocks said first retaining member from rotative shifting with respect to said generally conical interior surface in response to application of an outward force by said first pulling means;
said second support assembly, comprising;
    a second retaining member positionable generally transverse to and entirely inside said other end portion, said second retaining member having two generally parallel flange portions respectively engageable in face-to-face relation with two spaced apart portions of said generally cylindrical interior surface, and an intermediate portion which fronts upon said second opening when said parallel flange portions are engaged; and
    second pulling means acting between the intermediate portion of said second retaining member and the other of said seats for pulling said second retaining member outwardly toward said other seat;
    wherein each of said flange portions is bendable about a first point of contact with said generally cylindrical interior surface into progressive face-to-face engagement therewith in response to application of an outward force by said second pulling means.

2. The apparatus of claim 1, wherein said second retaining member includes at least three of said flange portions, said flange portions being equally spaced apart and so bendable simultaneously.

3. Apparatus for mounting a composite spring to a seat, said composite spring being made up of an elongated tubular elastomeric body having an end portion which includes a generally conical interior surface terminating in an opening, said end portion being reinforced to resist deformation, said apparatus comprising:
    an elongated retaining member positionable generally transverse to and entirely within said end portion, said retaining member having two oppositely inclined flanged portions respectively engageable in face-to-face relation with two spaced apart portions of said generally conical interior surface, and an intermediate portion which fronts upon said opening when said inclined flange portions are so engaged; and
    pulling means acting between the intermediate portion of said retaining member and said seat for pulling said retaining member outwardly toward said seat;
    wherein said retaining member includes means forming an edge extending generally parallel to the length of said retaining member, said edge being so constructed and arranged that a portion of said generally conical interior surface forms into a shoulder next to said edge and thereby blocks said retaining member from rotative shifting with respect to said generally conical interior surface in response to application of an outward force by said pulling means.

4. Apparatus for mounting a composite spring to a seat, said composite spring being made up of an elongated tubular elastomeric body having an end portion which includes a generally cylindrical interior surface terminating in an opening, said end portion being reinforced to resist deformation, said apparatus comprising:
    a retaining member positionable generally transverse to and entirely within said end portion, said retainig member having two generally parallel flange portions respectively engageable in face-to-face relation with two spaced apart portions of said generally cylindrical interior surface and an intermediate portion which fronts upon said opening when said parallel flange portions are so engaged; and pulling means acting between the intermediate portion of said retaining member and said seat for pulling said retaining member toward said seat;

wherein each of said parallel flange portions is bendable about a first point of contact with said generally cylindrical interior surface into progressive face-to-face therewith in response to application of an outward force by said pulling means.

5. The apparatus of claim 4, wherein said retaining member includes at least three of said flange portions, said flange portions being equally spaced apart and so bendable simultaneously.

6. Apparatus for mounting a composite spring between a first spring seat and a second spring seat, wherein the spring is made up of an elongated tubular elastomeric body having a cylindrical end and a tapered end, each of which includes reinforcing means resisting deformation, said apparatus comprising:

a first support assembly for supporting said tapered end, said first support assembly comprising a first retaining member positionable entirely inside said tapered end, and first pulling means connectable to the first spring seat for pulling said first retaining member in a direction out of said tapered end; and a second support assembly for supporting said cylindrical end, said second support assembly comprising a second retaining member positionable entirely inside said cylindrical end, and second pulling means connectable with the second spring seat for pulling said second retaining member in a direction out of said cylindrical end, said second retaining member including a flat base portion having an outline which registers with the inside of said cylindrical end, and a plurality of spaced apart flange portions upstanding from said base portion, said flange portions being bendable with respect to said base portion in response to a pulling force exerted by said second pulling means so as to spread apart and grip the inside of said cylindrical end.

* * * * *